US012794025B2

(12) United States Patent
Shin et al.

(10) Patent No.: US 12,794,025 B2
(45) **Date of Patent: *Nov. 10, 2026**

(54) BATTERY PACK AND DEVICE INCLUDING THE SAME

(71) Applicant: LG ENERGY SOLUTION, LTD., Seoul (KR)

(72) Inventors: Jongmok Shin, Daejeon (KR); Jinhyeong Choi, Daejeon (KR); Ji Hye Eom, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 868 days.

This patent is subject to a terminal disclaimer.

(21) Appl. No.: 17/785,275

(22) PCT Filed: Oct. 7, 2021

(86) PCT No.: PCT/KR2021/013818
§ 371 (c)(1),
(2) Date: Jun. 14, 2022

(87) PCT Pub. No.: WO2022/080760
PCT Pub. Date: Apr. 21, 2022

(65) Prior Publication Data

US 2022/0376311 A1 Nov. 24, 2022

(30) Foreign Application Priority Data

Oct. 12, 2020 (KR) ........................ 10-2020-0131093

(51) Int. Cl.
*H01M 10/42* (2006.01)
*H01M 50/209* (2021.01)
*H01M 50/507* (2021.01)

(52) U.S. Cl.
CPC ..... *H01M 10/425* (2013.01); *H01M 10/4207* (2013.01); *H01M 50/209* (2021.01);
(Continued)

(58) Field of Classification Search
CPC ........... H01M 10/425; H01M 10/4207; H01M 10/42; H01M 50/209; H01M 50/507;
(Continued)

(56) References Cited

U.S. PATENT DOCUMENTS

2002/0098321 A1* 7/2002 Lewis .................. B32B 27/322 428/118
2004/0026135 A1* 2/2004 Huitt ...................... G01G 21/23 177/210 R (Continued)

FOREIGN PATENT DOCUMENTS

CN 111224039 A 6/2020
JP 2010-142083 A 6/2010

(Continued)

OTHER PUBLICATIONS

JP_2016178066_A original file and translation (Year: 2016).*

(Continued)

*Primary Examiner* — Michael L Dignan
(74) *Attorney, Agent, or Firm* — Birch, Stewart, Kolasch & Birch, LLP

(57) ABSTRACT

A battery module includes a plurality of first battery modules and a plurality of second battery modules; a battery case that houses the battery modules and includes a plurality of cross beams for partitioning between the plurality of first battery modules and between the plurality of second battery modules; a plurality of first slave BMSs positioned at one side of the plurality of first battery modules facing the plurality of second battery modules; a plurality of second slave BMSs that are positioned at one side of the plurality of second
(Continued)

battery modules facing the plurality of first battery modules; a plurality of first reflected wave absorbers arranged on one side of the plurality of first battery modules facing the plurality of second battery modules; and a plurality of second reflected wave absorbers arranged on one side of the plurality of second battery modules facing the plurality of first battery modules.

15 Claims, 5 Drawing Sheets

(52) U.S. Cl.
CPC .. *H01M 50/507* (2021.01); *H01M 2010/4271* (2013.01); *H01M 2010/4278* (2013.01)

(58) Field of Classification Search
CPC ............... H01M 50/502; H01M 50/20; H01M 2010/4271; H01M 2010/4278; H01M 2220/20; Y02E 60/10; Y02T 10/70; Y02T 10/7072
See application file for complete search history.

(56) References Cited

U.S. PATENT DOCUMENTS

2009/0175323 A1 7/2009 Chung
2013/0253715 A1 9/2013 Cho et al.
2014/0300364 A1 10/2014 Choi
2017/0331159 A1* 11/2017 Keser ................ H01M 10/4257
2018/0252734 A1 9/2018 Azzell
2019/0067755 A1 2/2019 Kim et al.
2019/0242949 A1* 8/2019 Lemkin ................ H01M 10/42
2019/0252734 A1* 8/2019 Razzell ............... H01M 10/425
2019/0260097 A1* 8/2019 Kwon ................. H02J 7/00036
2019/0267682 A1 8/2019 Seo et al.
2020/0006815 A1 1/2020 Hwang et al.
2021/0218071 A1* 7/2021 Aoki ................... H01M 10/425
2022/0328890 A1* 10/2022 Aoki ................... H01M 50/209
2022/0336842 A1* 10/2022 Horie .................. H01M 10/486
2022/0367984 A1 11/2022 Numata et al.
2023/0071238 A1 3/2023 Hwang
2023/0223550 A1* 7/2023 Horie ...................... H01M 4/70
429/7
2023/0318094 A1* 10/2023 Horie .................. H01M 10/052
429/56

FOREIGN PATENT DOCUMENTS

JP 5032673 B2 9/2012
JP 2016178066 A * 10/2016 ............... B60K 1/04
JP 2020-166930 A 10/2020
JP 2023-504158 A 2/2023
JP 2021-118136 A 8/2026
KR 10-2012-0134004 A 12/2012
KR 10-2014-0121186 A 10/2014
KR 101776853 B1 * 9/2017
KR 10-2018-0010869 A 1/2018
KR 20180010869 A * 1/2018
KR 10-2018-0112617 A 10/2018
KR 20180112617 A * 10/2018
KR 10-2019-0023295 A 3/2019
KR 10-2019-0034868 A 4/2019
WO WO 2015/189898 A1 12/2015

OTHER PUBLICATIONS

KR_101776853_B1 original file and translation (Year: 2017).*
KR_20180112617_A original file and translation (Year: 2018).*
KR_20180010869_A Original and Translated File (Year: 2018).*
Extended European Search Report for European Application No. 21880407.8, dated May 22, 2024.
International Search Report (PCT/ISA/210) issued in PCT/KR2021/013818, dated Feb. 6, 2022.

* cited by examiner

【FIG. 1】
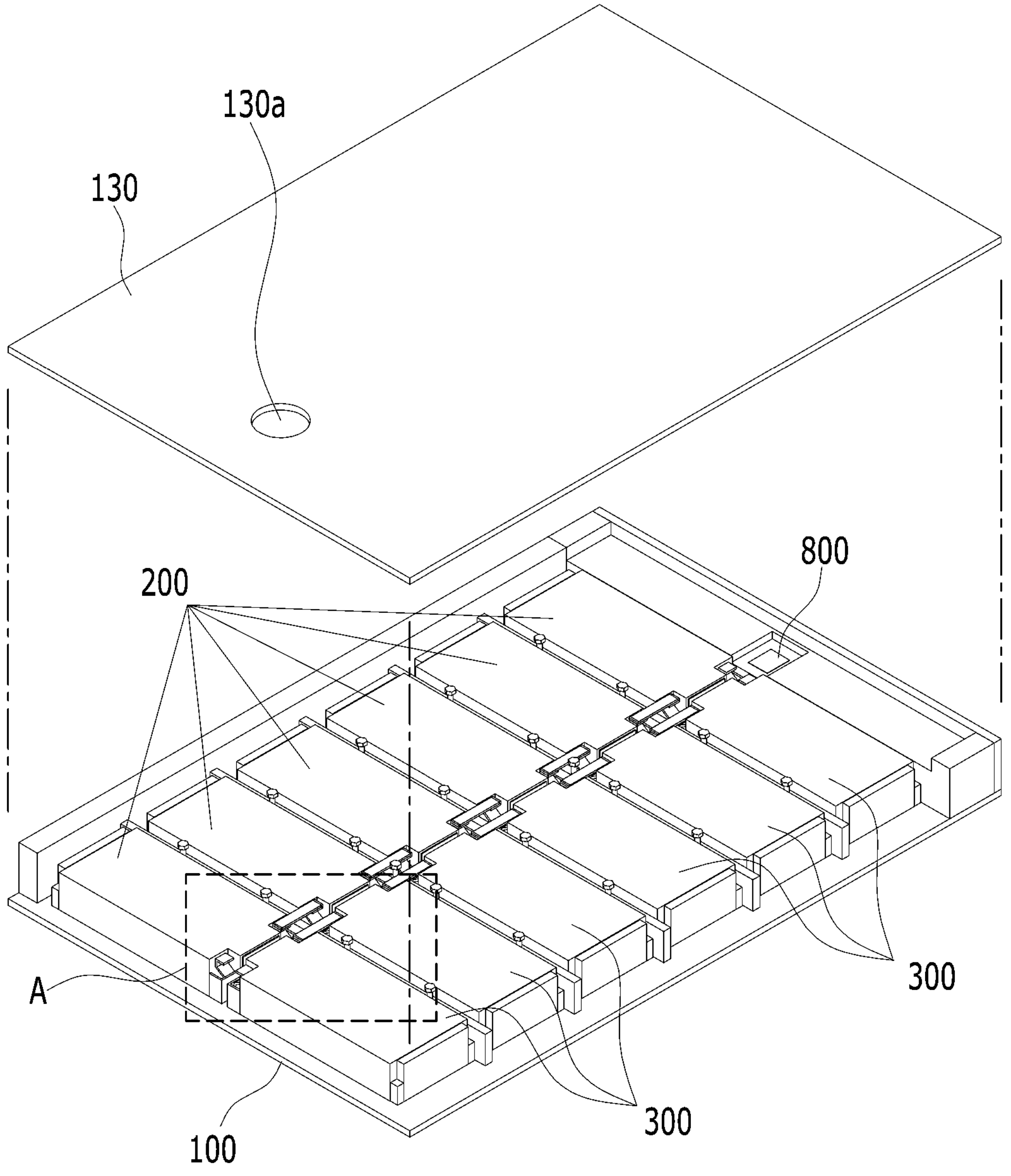

【FIG. 2】
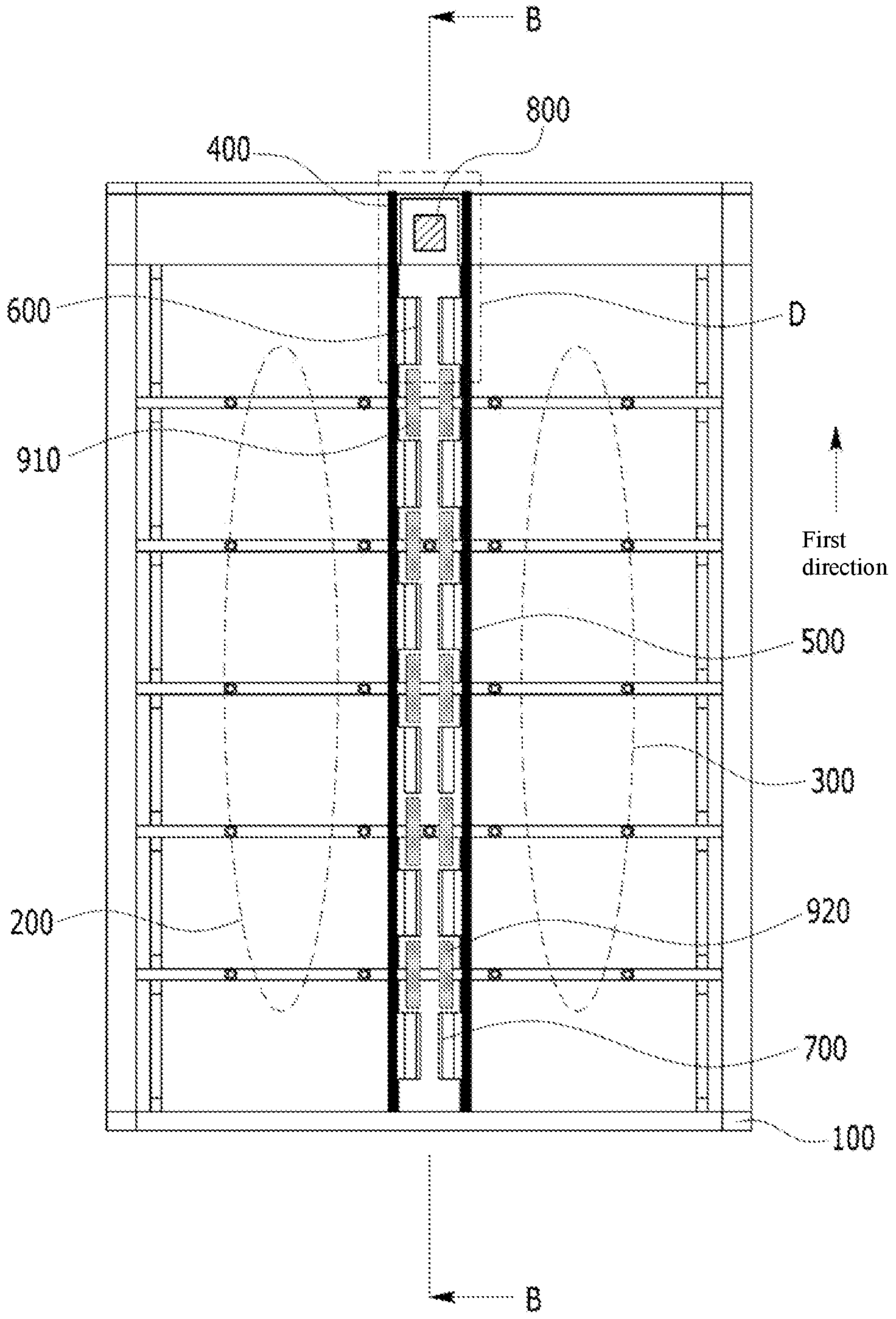

【FIG. 3】
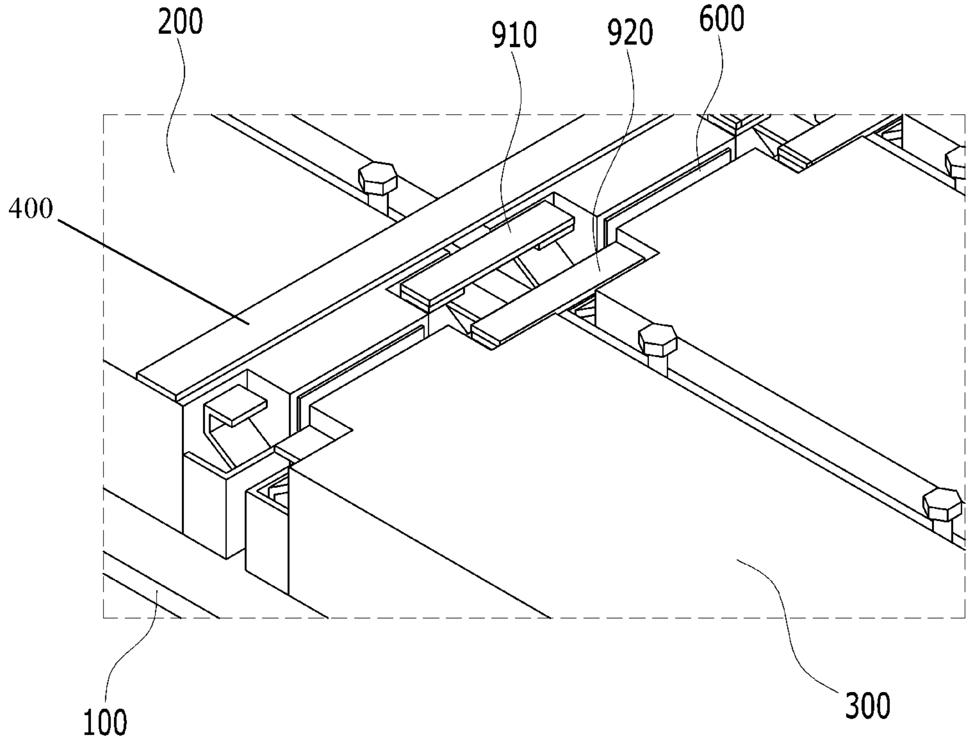
【FIG. 4】
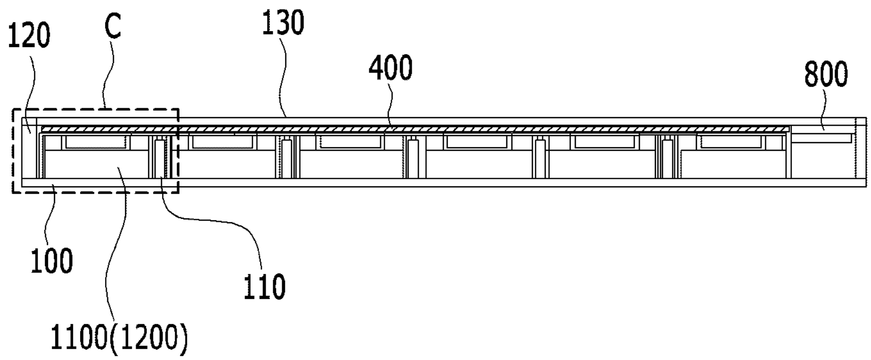

【FIG. 5】
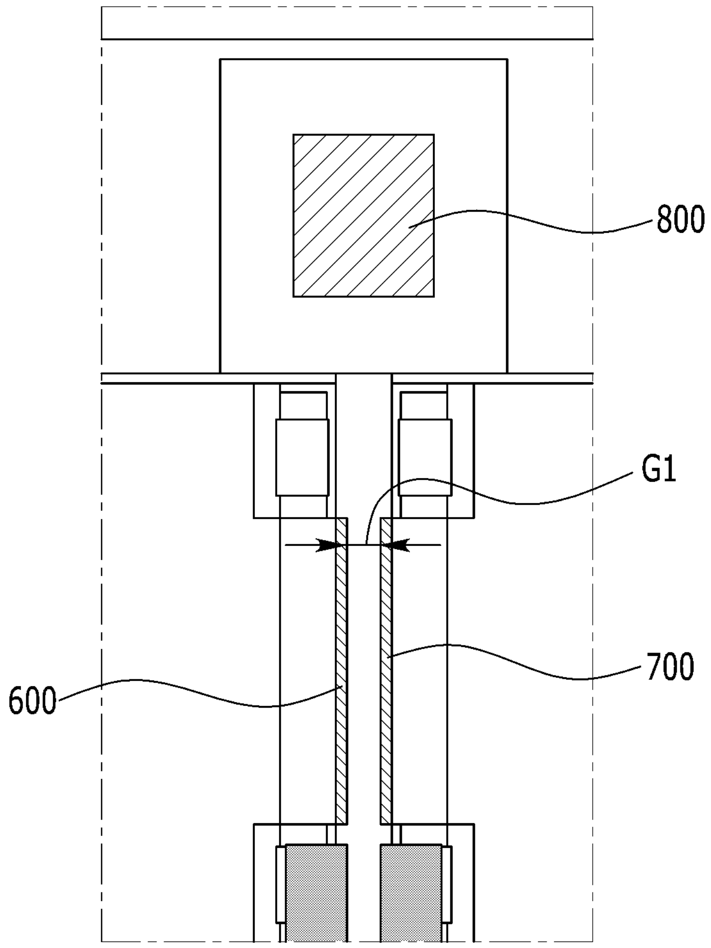

【FIG. 6】
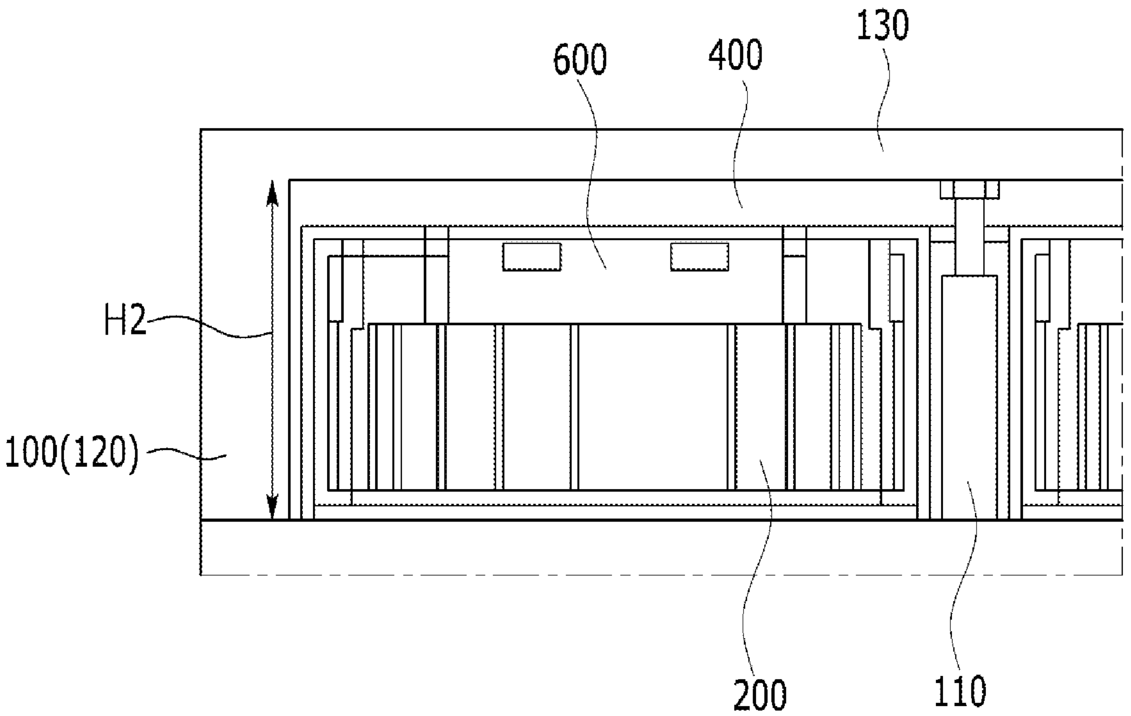
【FIG. 7】
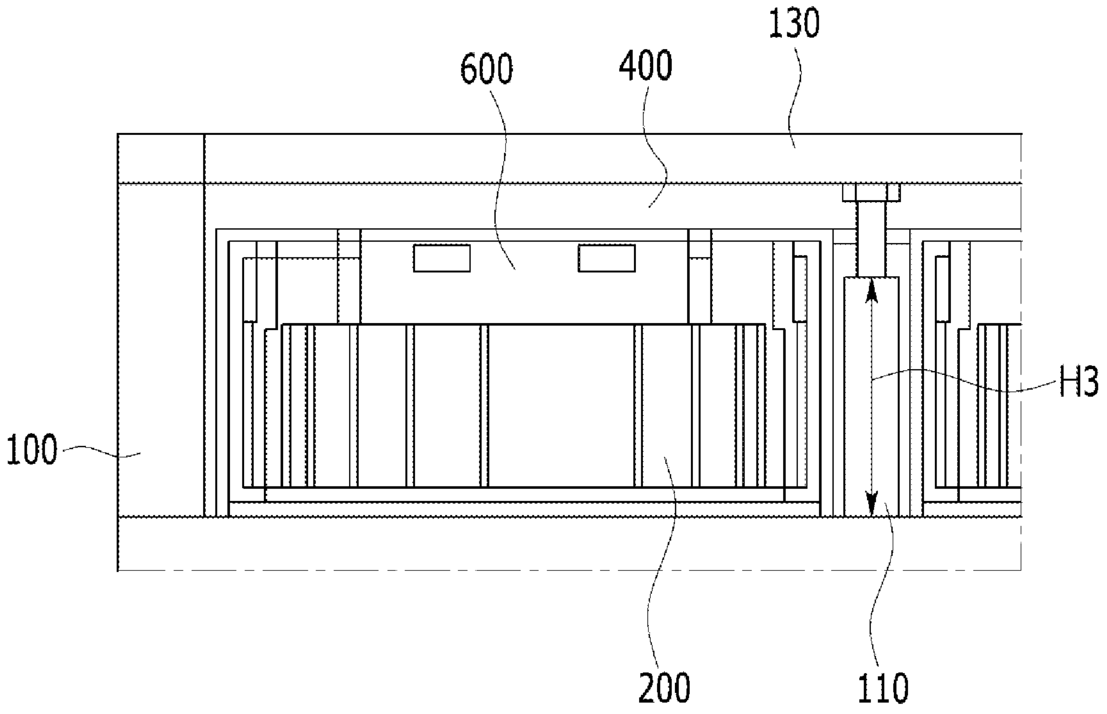

BATTERY PACK AND DEVICE INCLUDING THE SAME

CROSS CITATION WITH RELATED APPLICATION(S)

This application claims the benefit of Korean Patent Application No. 10-2020-0131093 filed on Oct. 12, 2020 with the Korean Intellectual Property Office, the disclosure of which is incorporated herein by reference in its entirety.

TECHNICAL FIELD

The present disclosure relates to a battery pack and a device including the same, and more particularly to a battery pack capable of securing the wireless transmission performance and a device including the same.

BACKGROUND

Generally, a secondary battery capable of being charged and discharged is widely used as a battery that is a power source for wireless mobile devices. Such batteries are also in the spotlight as a power source for electric vehicles (EVs), hybrid electric vehicles (HEVs), and the like, which have been proposed as a method for solving the air pollution problem of conventional gasoline or diesel vehicles using fossil fuels. When these batteries are alternately charged and discharged, there is a need to efficiently control the charge and discharge of the battery so that the battery maintains proper operating conditions and performance.

For this purpose, a battery management system (BMS) that manages the condition and performance of the battery is provided in the battery pack. BMS manages a battery by measuring the current, voltage, temperature, etc. of the battery and recording them in memory.

On the other hand, as the need for a high-capacity secondary battery structure has increased recently, including the utilization of secondary batteries as an energy storage source, there is an increasing demand for a battery pack having a multi-module structure which is an assembly of battery modules in which a plurality of secondary batteries are connected in series/parallel.

Such a battery pack having a multi-module structure may be implemented in various types of pack structures depending on the configuration of circuits, PCBs, and the like. A multi-BMS structure composed of a plurality of slave BMSs that can easily control the condition of the secondary battery and a master BMS that integrally controls the plurality of slave BMSs is mainly used.

Conventionally, the communication between the master BMS and the slave BMS used the wired BMS method, but a wireless BMS method (WBMS, Wireless Battery Management System) has recently been in the spotlight for improvement such as cost reduction, securing of design freedom, and weight reduction. Through the wireless BMS method, the wire harness traditionally used for wired connections is unnecessary, which can bring about cost reduction and weight reduction. The weight reduction can also bring about the effect of improving the fuel efficiency of electric vehicles provided with battery packs. In addition, it is possible to remove the connector traditionally used for the wired connection, thereby reducing cost and defective rate.

One of the most important parts of the wireless BMS method is the performance of the antenna, and the performance of the antenna may vary depending on the operating environment of the antenna. Particularly, in the case of a battery pack mounted on an electric vehicle, the size is large and the periphery is made of a metal material. Thus, a multi-path phenomenon due to reflection may occur and communication may deteriorate. Therefore, in the wireless BMS system, it may be essential to design a battery pack structure capable of minimizing the deterioration of wireless communication performance.

DETAILED DESCRIPTION OF THE INVENTION

Technical Problem

It is an object of the present disclosure to provide a battery pack capable of securing the wireless transmission performance and a device including the same.

The objects of the present disclosure are not limited to the aforementioned objects, and other objects which are not described herein should be clearly understood by those skilled in the art from the following detailed description.

Technical Solution

In order to achieve the above object, according to one embodiment of the present disclosure, there is provided a battery pack comprising: a plurality of first battery modules and a plurality of second battery modules that are arranged in two rows extending in a first direction; a battery case that houses the plurality of first battery modules and the plurality of second battery modules and includes a plurality of cross beams for partitioning between the plurality of first battery modules and between the plurality of second battery modules; a plurality of first slave BMSs that are positioned at a first side of the plurality of first battery modules facing the plurality of second battery modules and are arranged in the first direction; a plurality of second slave BMSs that are positioned at a first side of the plurality of second battery modules facing the plurality of first battery modules and are arranged in the first direction; a plurality of first reflected wave absorbers arranged on the first side of the plurality of first battery modules; and a plurality of second reflected wave absorbers arranged on the first side of the plurality of second battery modules.

The battery pack may further comprise a first wave path guide extending in the first direction at an upside part of the plurality of first battery modules; and a second wave path guide extending in the first direction at an upside part of the plurality of second battery modules.

The plurality of first slave BMSs and the plurality of second battery modules may be respectively arranged in the first direction between the first wave path guide and the second wave path guide.

The plurality of first reflected wave absorbers may be arranged apart from the first wave path guide and the first slave BMS and under the first wave path guide and the first slave BMS, and the plurality of second reflected wave absorbers may be arranged apart from the second wave path guide and the second slave BMS and under the second wave path guide and the second slave BMS.

The battery pack may further comprise a master BMS formed separately from the plurality of first and second battery modules and between the first wave path guide and the second wave path guide.

The first and second wave path guides may extend in the first direction so as to pass through the plurality of first and second battery modules, and the master BMS may be arranged at a position separated from the plurality of first and second battery modules in the first direction.

The plurality of first reflected wave absorbers may be arranged so as to correspond to the plurality of first slave BMSs and under the plurality of first slave BMSs, and the plurality of second reflected wave absorbers may be arranged so as to correspond to the plurality of second slave BMSs and under the plurality of second slave BMSs.

The first wave path guide may be formed between a battery pack upper cover and the plurality of first battery modules, and the second wave path guide may be formed between the battery pack upper cover and the plurality of second battery modules.

An antenna may be formed in the first and second slave BMSs.

The battery pack may further comprise a battery pack upper cover that covers an upper surface of the battery case, wherein at least one hole may be formed in the battery pack upper cover.

The battery pack may comprise a plurality of first bus bars that span between two adjacent battery modules among the battery modules of the plurality of first battery modules; and a plurality of second bus bars span between two adjacent battery modules among the battery modules of the plurality of second battery modules.

According to one embodiment of the present disclosure, there is provided a device comprising the above-mentioned battery pack.

Advantageous Effects

A battery pack and a device including the same according to one embodiment of the present disclosure can provide a battery pack structure provided with a WBMS having a novel structure, thereby securing the wireless communication performance of the battery.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view showing a battery pack according to an embodiment of the present disclosure;

FIG. 2 is a top view of the battery pack of FIG. 1 as viewed from above;

FIG. 3 shows a section A of FIG. 1, which is a view showing a state in which a hole is formed in the battery pack upper cover according to an embodiment of the present disclosure;

FIG. 4 shows a section B-B of FIG. 2, which is a cross-sectional view showing a central portion of a battery pack provided with a reflected wave absorber according to an embodiment of the present disclosure;

FIG. 5 shows a section D of FIG. 2, which is a view showing an interval between slave BMSs according to an embodiment of the present disclosure;

FIG. 6 shows a section C of FIG. 4, which is a view showing the height of the outside wall of the battery case according to an embodiment of the present disclosure; and FIG. 7 shows a section C of FIG. 4, which is a view showing a height of a cross beam of a battery case according to an embodiment of the present disclosure.

DETAILED DESCRIPTION OF THE EMBODIMENTS

It should be appreciated that the exemplary embodiments, which will be described below, are illustratively described to assist in the understanding of the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms “comprise”, “include”, and “have” as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Below, the battery pack provided with BMS according to one embodiment of the present disclosure will be described with reference to FIGS. 1 to 4.

FIG. 1 is a perspective view showing a battery pack according to an embodiment of the present disclosure. FIG. 2 is a top view of the battery pack of FIG. 1 as viewed from above. FIG. 3 shows a section A of FIG. 1, which is a view showing a state in which a hole is formed in the battery pack upper cover according to an embodiment of the present disclosure. FIG. 4 shows a section B-B of FIG. 2, which is a cross-sectional view showing a central portion of a battery pack provided with a reflected wave absorber according to an embodiment of the present disclosure.

Referring to FIGS. 1 to 4, the battery pack according to one embodiment of the present disclosure includes a plurality of first battery modules 200 and a plurality of second battery modules 300 that are arranged in two rows in a first direction, and a battery case 100 that houses the plurality of first and second battery modules 200 and 300 and includes a plurality of cross beams 110 for partitioning between the plurality of first battery modules 200 and between the plurality of second battery modules 300. The plurality of first battery modules 200 and the plurality of second battery modules 300 may be arranged so as to face each other.

Further, the battery pack includes a first wave path guide 400 that is formed to extend along a first direction at an upside part of the plurality of first battery modules 200; and a second wave path guide 500 that is formed to extend along a first direction at an upside part of the plurality of second battery modules 300.

Further, the battery pack includes a plurality of first slave BMSs 600 that are positioned at one side of the plurality of first battery modules 200 facing the plurality of second battery modules 300 and are arranged in the first direction between the first wave path guide 400 and the second wave path guide 500, and a plurality of second slave BMSs 700 that are positioned on one side of the plurality of second battery modules 300 facing the plurality of first battery modules 200 and are arranged in the first direction between the first wave path guide 400 and the second wave path guide 500.

Referring to FIG. 1, the battery case 100 houses a plurality of first and second battery modules 200 and 300. The plurality of module regions of the battery case 100 may be formed to have sizes corresponding to the sizes of the first and second battery modules 200 and 300, respectively. The plurality of first and second battery modules 200 and 300 may be seated on the plurality of module regions, respectively.

According to the present embodiment, the plurality of first battery modules 200 are arranged along a first direction, and the plurality of second battery modules 300 are arranged along a first direction at the side face of the plurality of first battery modules 200, thereby forming a two-row battery module arrangement structure. At this time, each battery module constituting the plurality of first battery modules 200 may be arranged apart from each other so as to face each battery module constituting the plurality of second battery modules 300.

Referring to FIGS. 2 and 4, a cross beam 110 may be formed between module regions to partition between battery modules arranged in each module region. The cross beam 110 can protect the plurality of first and second battery modules 200 and 300 from the physical force acting from the outside together with the outside wall 120 forming the outer periphery of the battery case 100.

The thermal conductive resin layer can be formed on the bottom face of the battery case 100. The thermal conductive resin layer can transfer the heat generated from the plurality of first and second battery modules 200 and 300 arranged in each of the plurality of module regions to the outside of the battery pack.

According to the present embodiment, the first slave BMS 600 may be arranged in each of the plurality of first battery modules 200. More specifically, the first slave BMS 600 may be arranged in portions facing the plurality of second battery modules 300. The first slave BMS 600 may be arranged in the central portion of the battery case 100. That is, the first slave BMS 600 is arranged in one side part of the plurality of first battery modules 200 along the first direction among the plurality of first and second battery modules 200 and 300, and thus can be arranged across the central portion of the battery case 100.

The second slave BMS 700 may be arranged in each of the plurality of second battery modules 300. More specifically, the second slave BMS 700 may be arranged in portions facing the plurality of first battery modules 200. The second slave BMS 700 may be arranged in the central portion of the battery case 100. That is, the second slave BMS 700 is arranged in one side part of the plurality of second battery modules 300 along the first direction between the plurality of first and second battery modules 200 and 300, and thus can be arranged across the central portion of the battery case 100.

Looking at the wireless transmission characteristics according to the arrangement position of the master BMS and the slave BMS, it may be more advantageous in terms of wireless transmission performance that the slave BMS is located in the central portion of the battery case as in the present embodiment, that is, in the space between the battery modules as shown in FIG. 1, rather than the slave BMS being located on the outer hull part of the battery case.

The battery pack according to the present embodiment includes a first wave path guide 400 formed to extend along the first direction at the upside part of the plurality of first battery modules 200, and a second wave path guide 500 formed to extend along the first direction at the upside part of the plurality of second battery modules 300. At this time, the first slave BMS 600 and the second slave BMS 700 according to the present embodiment may be disposed in a space formed between the first and second wave path guides 400 and 500. In addition, the first wave path guide 400 is formed between the battery pack upper cover 130 and the plurality of first battery modules 200, and the second wave path guide 500 may be formed between the battery pack upper cover 130 and the plurality of second battery modules 300.

The battery pack according to the present embodiment is mainly mounted inside the electric vehicle, and the periphery of the battery pack to be mounted is made of a metal material. Thus, the communication performance may deteriorate due to the multi-path phenomenon of radio waves reflected by the metal material. Thus, according to the present embodiment, the first and second wave path guides 400 and 500 can be formed so as to cover the space between the plurality of first and second battery modules 200 and 300 provided with the plurality of first and second slave BMSs 600 and 700. Therefore, it is possible to concentrate the wireless transmission signal distribution in the space between the plurality of first and second battery modules 200 and 300 formed between the first and second wave path guides 400 and 500, thereby improving the wireless transmission performance. Further, the deterioration that may occur in communication between the master BMS 800 and the first and second slave BMSs 600 and 700 can be minimized.

According to the experimental example, it can be confirmed that in the battery pack in which the central arrangement structure of the first and second slave BMS 600 and 700 and the arrangement structure of the first and second wave path guides 400 and 500 according to the present embodiment are formed, the wireless transmission coefficient S21 among the S-parameters is improved by about 18 dB from −53.78 dB to −35.21 dB to construct a stable communication connection structure, as compared with the conventional battery pack structure in which slave BMSs are arranged outside and no wave path guide is installed, According to the present embodiment, the battery pack may further include a master BMS 800 formed separately from the plurality of first and second battery modules between the first wave path guide 400 and the second wave path guide 500. The master BMS 800 may communicate with a host system. The master BMS 800 can mainly manage communication with the plurality of first and second slave BMSs 600 and 700.

The first and second wave path guides 400, 500 are formed by passing through the plurality of first and second battery modules 200 and 300 and extending in the first direction up to a position where the master BMS 800 is arranged, and the master BMS 800 is arranged at a position separated from the plurality of first and second battery modules 200 and 300 in the first direction. At this time, the master BMS 800 may be arranged symmetrically with the plurality of first and second battery modules 200 and 300.

Therefore, the master BMS 800 is arranged at a position symmetrically separated from the plurality of first and second slave BMSs 600 and 700, so that communication with the slave BMSs can be performed in a balanced manner. Further, the master BMS 800 is arranged in the space between the first and second wave path guides 400 and 500 together with the first and second slave BMSs 600 and 700, so that communication deterioration between the master BMS 800 and the first and second slave BMS 600 and 700 can be minimized, and wireless communication performance can be secured.

According to the present embodiment, antennas can be formed in the first and second slave BMSs 600 and 700. The antenna may include a chip antenna. According to the experimental example, when a chip antenna is used for the first and second slave BMS 600 and 700 according to the present embodiment, it is possible to secure excellent wireless performance by 10 dB or more as compared with the case of using a pattern antenna.

Referring to FIG. 1, the battery pack according to the present embodiment further includes a battery pack upper cover 130 that covers the upper surface of the battery case 100. At this time, at least one hole 130*a* may be formed in the battery pack upper cover 130.

The heat dissipation function of the battery pack can be performed through the hole 130*a* formed in the battery pack upper cover 130. However, noise may occur during communication between the BMSs due to the hole 130*a* that connects the outside and the inside of the battery pack. When the size of the hole 130*a* increases, noise may also increase. Therefore, the number and size of the holes 130*a* that can appropriately satisfy both the heat dissipation performance and the noise performance at the same time can be applied. According to the experimental example, as a result of investigating the wireless transmission characteristics and noise control performance, in the case of a worst case, such as a hole located directly above the antenna of the master BMS or slave BMS, or a mobile phone hotspot located near the hole, wireless transmission performance can be secured when designing a hole diameter of 45 mm or less. Noise control performance can be secured when it is designed to be less than 20 mm. However, even if there are a plurality of holes, the same noise control performance can be obtained. Thus, in consideration of heat dissipation and noise performance, a structure in which a plurality of holes having a small diameter are arranged may be advantageous. Although only one hole 130*a* is shown in FIG. 1, a plurality of holes may be arranged in the battery pack upper cover 130 according to the experimental example.

Referring to FIG. 4, the battery pack according to one embodiment of the present disclosure includes a plurality of first reflected wave absorbers 1100 arranged on one side of the plurality of first battery modules 200 facing the plurality of second battery modules 300, and a plurality of second reflected wave absorbers 1200 arranged on one side of the plurality of second battery modules 300 facing the plurality of first battery modules 200.

When an artificial propagation passage space is generated by using the first and second wave path guides 400 and 500 as in the present embodiment, the transmission signal is concentrated in the space between the first and second wave path guides 400 and 500, whereby the reflected interference waves from the components provided between the first and second wave path guides 400 and 500 are generated and thus, the wireless communication performance may decrease.

Thus, according to the present embodiment, as shown in FIG. 4, a plurality of first reflected wave absorbers 1100 can be arranged for each battery module on one side of the plurality of first battery modules 200 and thus, it is possible to absorb the reflected interference waves that may be generated from components provided between the first and second wave path guides 400 and 500, and to create an environment in which the wireless communication is not disturbed by the reflected interference waves.

Only the configuration of the plurality of first reflected wave absorbers 1100 provided on one side of the plurality of first battery modules 200 is disclosed in FIG. 4, but the plurality of second battery modules 300 are also symmetrically arranged with the arrangement structure of the plurality of first battery modules 200 of FIG. 4. Therefore, a plurality of second reflected wave absorbers 1200 are also provided on one side of the plurality of second battery modules 300, and the plurality of first reflected wave absorbers 1100 and the plurality of second reflected wave absorbers 1200 may be arranged symmetrically with each other.

According to the present embodiment, the plurality of first reflected wave absorbers 1100 may be arranged apart from the first wave path guide 400 and the first slave BMS 600 under the first wave path guide 400 and the first slave BMS 600. The plurality of second reflected wave absorbers 1300 may be arranged apart from the second wave path guide 500 and the second slave BMS 700 under the second wave path guide 500 and the second slave BMS 700.

At this time, the plurality of first reflected wave absorbers 1100 may be arranged so as to correspond to the plurality of first slave BMSs 600 under the plurality of first slave BMSs 600. Further, the plurality of second reflected wave absorbers 1200 may be arranged so as to correspond to the plurality of second slave BMSs 700 under the plurality of second slave BMSs 700.

In this manner, the first and second reflected wave absorbers 1100 and 1200 are arranged at positions spaced apart from the first and second slave BMSs 600 and 700, and thus, can be installed at positions that do not interfere with the wireless communication functions of the first and second slave BMSs 600 and 700. The first and second reflected wave absorbers 1100 and 1200 are provided inside the battery pack together with the first and second wave path guides 400 and 500, whereby in a state in which the transmission path has directionality through the first and second wave path guides 400 and 500, the reflected interference propagation can be removed through the first and second reflected wave absorbers 1100 and 1200, and thus, the wireless transmission performance of the battery pack according to the present embodiment can be maximized.

FIG. 5 shows a section D of FIG. 2, which is a view showing an interval between slave BMSs according to an embodiment of the present disclosure.

According to the present embodiment, the plurality of first slave BMS 600 and the plurality of second slave BMS 700 may be formed apart from each other so as to have a gap G1 as shown in FIG. 5. More specifically, the plurality of first slave BMS 600 arranged in the plurality of first battery modules 200 and the plurality of second slave BMS 700 arranged in the plurality of second battery modules 300 may formed to be separated from each other.

According to the present embodiment, the separation distance between the first slave BMS 600 and the second slave BMS 700 may be formed to be 50 mm. Conventionally, the distance between the two battery modules arranged in two rows was arranged as narrow as 30 mm, but the distance between the two battery modules is increased to 50 mm as in the present embodiment, so that the wireless transmission space is increased, and thus the wireless transmission performance can be improved.

FIG. 6 shows a section C of FIG. 4, which is a view showing the height of the outside wall of the battery case according to an embodiment of the present disclosure.

Referring to FIG. 6, the battery pack according to one embodiment of the present disclosure may be configured such that the upper end of the outside wall 120 of the battery case 100 and the battery pack upper cover 130 are coupled, and the battery pack upper cover 130 may be formed apart from the plurality of first and second battery modules 200 and 300.

According to the present embodiment, the height H2 of the outside wall 120 may be formed to be 138 mm. Conventionally, the height of the outside wall is formed to be 128 mm, but according to the present embodiment, the wireless transmission performance can be improved by making the height H2 of the outside wall 120 higher than the height of the conventional outside wall. In other words, as the height H2 of the outside wall 120 increases, the wireless transmission performance can be more improved.

FIG. 6 shows only the portion in which the plurality of first slave BMS 600 and the first wave path guide 400 are formed, but a portion in which the plurality of second slave BMS 700 and the second wave path guide 500 formed at mutually opposite sides are also arranged symmetrically as in the configuration of FIG. 6.

FIG. 7 shows a section C of FIG. 4, which is a view showing a height of a cross beam of a battery case according to an embodiment of the present disclosure.

Referring to FIGS. 3 and 7, the battery pack according to one embodiment of the present disclosure may include a plurality of first bus bars 910 arranged so as to span between two adjacent battery modules among each battery module of the plurality of first battery modules 200, and a plurality of second bus bars 920 arranged so as to span between two adjacent battery modules among each battery module of the plurality of second battery modules 300. At this time, the cross beam 110 may be formed apart from the plurality of first and second bus bars 910 and 920 under the plurality of first and second bus bars 910 and 920, respectively.

According to the present embodiment, the height of the cross beam 110 may be formed to be 70 mm. The height of the conventional cross beam 110 was formed to be about 90 mm, but according to the present embodiment, the height H3 of the cross beam 110 can be made lower than that of the conventional cross beam 110, thereby improving the wireless transmission performance. In other words, as the height H3 of the cross beam 110 decreases, the wireless transmission performance can be more improved.

FIG. 7 shows only a portion in which the plurality of first slave BMS 600 and the first wave path guide 400 are formed, but a portion in which the plurality of second slave BMSs 700 and the second wave path guide 500 formed at mutually opposite sides are also symmetrically arranged as in the configuration of FIG. 6.

The above-mentioned battery pack can be applied to various devices. Such a device can be applied to a vehicle means such as an electric bicycle, an electric vehicle, or a hybrid vehicle, but the present disclosure is not limited thereto, and is applicable to various devices capable of using a battery module, which also falls under the scope of the present disclosure.

Although the invention has been shown and described above with reference to the preferred embodiments, the scope of the present disclosure is not limited thereto, and numerous other modifications and embodiments can be devised by those skilled in the art, which will fall within the spirit and scope of the principles of the invention described in the appended claims. Further, these modified embodiments should not be understood individually from the technical spirit or perspective of the present disclosure.

DESCRIPTION OF REFERENCE NUMERALS

100: battery case
110: cross beam
120: outside wall
130: battery pack upper cover
130*a*: hole
200: first battery module
300: second battery module
400: first wave path guide
500: second wave path guide
600: first slave BMS
700: second slave BMS
800: master BMS
910: first bus bar
920: second bus bar
1100: first reflected wave absorber
1200: second reflected wave absorber

The invention claimed is:

1. A battery pack comprising:

a plurality of first battery modules and a plurality of second battery modules that are arranged in two rows extending in a first direction and spaced from each other in a second direction perpendicular to the first direction;

a battery case that houses the plurality of first battery modules and the plurality of second battery modules and includes a plurality of cross beams for partitioning between the plurality of first battery modules and between the plurality of second battery modules;

a plurality of first slave BMSs that are positioned at a first side of the plurality of first battery modules facing the plurality of second battery modules and are arranged in the first direction;

a plurality of second slave BMSs that are positioned at a first side of the plurality of second battery modules facing the plurality of first battery modules and are arranged in the first direction;

a plurality of first reflected wave absorbers arranged on the first side of the plurality of first battery modules;

a plurality of second reflected wave absorbers arranged on the first side of the plurality of second battery modules;

a first wave path guide extending in the first direction and overlying the plurality of first battery modules in a third direction perpendicular to the first direction and the second direction; and a second wave path guide extending in the first direction and overlying the plurality of second battery modules in the third direction.

2. The battery pack of claim 1, wherein the plurality of first slave BMSs and the plurality of second slave BMSs are respectively arranged in the first direction between the first wave path guide and the second wave path guide in the second direction.

3. The battery pack of claim 2, wherein the plurality of first reflected wave absorbers are arranged apart from the first wave path guide and the first slave BMS and under the first wave path guide and the first slave BMS, and the plurality of second reflected wave absorbers are arranged apart from the second wave path guide and the second slave BMS and under the second wave path guide and the second slave BMS.

4. The battery pack of claim 1, further comprising a master BMS formed separately from the plurality of first and second battery modules and between the first wave path guide and the second wave path guide.

5. The battery pack of claim 4, wherein the first and second wave path guides extend in the first direction so as to pass through the plurality of first and second battery modules, and wherein the master BMS is arranged at a position separated from the plurality of first and second battery modules in the first direction.

6. The battery pack of claim 4, wherein the plurality of first reflected wave absorbers are arranged so as to correspond to the plurality of first slave BMSs and under the plurality of first slave BMSs, and wherein the plurality of second reflected wave absorbers are arranged so as to correspond to the plurality of second slave BMSs and under the plurality of second slave BMSs.

7. The battery pack of claim 1, wherein the first wave path guide is formed between a battery pack upper cover and the plurality of first battery modules, and wherein the second wave path guide is formed between the battery pack upper cover and the plurality of second battery modules.

8. The battery pack of claim 1, wherein an antenna is formed in the first and second slave BMSs.

9. The battery pack of claim 1, further comprising a battery pack upper cover that covers an upper surface of the battery case, wherein at least one hole is formed in the battery pack upper cover.

10. The battery pack of claim 1, further comprising a plurality of first bus bars span between two adjacent battery modules among the battery modules of the plurality of first battery modules; and a plurality of second bus bars span between two adjacent battery modules among the battery modules of the plurality of second battery modules.

11. A device comprising the battery pack of claim 1.

12. The battery pack of claim 1, wherein each of the first wave path guide and the second wave path guide is a strip, and wherein the first wave path guide and the second wave path guide are physically separate from one another.

13. The battery pack of claim 1, wherein the first wave path guide and the second wave path guide are physically separate from one another.

14. The battery pack of claim 1, wherein the plurality of first slave BMSs is between the first wave path guide and the second wave path guide in the second direction.

15. The battery pack of claim 14, wherein the plurality of second slave BMSs is between the first wave path guide and the second wave path guide in the second direction.

* * * * *